(12) United States Patent
Takahashi (10) Patent No.: US 8,261,793 B2
(45) Date of Patent: Sep. 11, 2012

(54) PNEUMATIC TIRE

(75) Inventor: Toshihiko Takahashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 365 days.

(21) Appl. No.: 12/619,832

(22) Filed: Nov. 17, 2009

(65) Prior Publication Data

US 2010/0139831 A1 Jun. 10, 2010

(30) Foreign Application Priority Data

Dec. 8, 2008 (JP) ................. 2008-312504

(51) Int. Cl.
*B60C 13/00* (2006.01)
*B60C 13/02* (2006.01)
*B60C 15/00* (2006.01)

(52) U.S. Cl. .............. 152/523; 152/525; 152/539

(58) Field of Classification Search .................. None
See application file for complete search history.

(56) References Cited

U.S. PATENT DOCUMENTS

| | | | | |
|---|---|---|---|---|
| 2,761,489 | A * | 9/1956 | Kraft .......................... | 156/116 |
| 4,253,512 | A * | 3/1981 | Yoshioka et al. ............ | 152/452 |
| 2001/0002604 | A1 | 6/2001 | Ikeda | |

FOREIGN PATENT DOCUMENTS

| | | |
|---|---|---|
| JP | 11-198614 | 7/1999 |
| JP | 11-291722 | 10/1999 |
| JP | 2000-16032 | * 4/2000 |
| JP | 2001-163018 | 6/2001 |
| JP | 2004-17829 | 1/2004 |
| JP | 2004-306873 | * 11/2004 |
| JP | 2004-359099 | * 12/2004 |
| JP | 2008-126699 | * 6/2008 |

OTHER PUBLICATIONS

Machine translation of JP 2008-126699, 2008.*

* cited by examiner

*Primary Examiner* — Justin Fischer
(74) *Attorney, Agent, or Firm* — Fish & Richardson P.C.

(57) ABSTRACT

A pneumatic tire has a pair of bead portions, side wall portions, a tread portion, and a carcass ply rolled up in its end portion so as to pinch a bead filler. An outer surface of the side wall portion is provided with a concavo-convex region formed by arranging a lot of projecting lines extending in a tire circumferential direction in parallel in the tire diametrical direction, and an arranged density of the projecting lines becomes larger toward the outer side in the tire diametrical direction. An outer peripheral end of the concavo-convex region is positioned in the outer side than a position where an interface between a tread rubber and a side rubber is exposed, and an inner peripheral end of the concavo-convex region is positioned in an inner side than a leading end of the bead filler.

9 Claims, 5 Drawing Sheets

PNEUMATIC TIRE

BACKGROUND OF THE INVENTION

1. Field of the Invention

The present invention relates to a pneumatic tire in which a lot of projecting lines (ridges) are formed on an outer surface of a side wall portion.

2. Description of the Related Art

In a vulcanization molding of a tire, a pressure and a heat are applied for a fixed time to a green tire in a state in which an outer surface of a side wall portion is pressed against an inner peripheral surface of a mold. At this time, it is necessary to suitably let out air existing between the outer surface of the side wall portion and the inner peripheral surface of the mold, and if the air is trapped without smoothly letting out the air, a concave scratch called a light is generated due to a fault of a rubber flow, and there is a case that an appearance of the tire is deteriorated.

The mold used for the vulcanization molding of the tire is generally provided with a ventilation hole called a vent hole for letting out the air. However, since the vent holes are set in a dotted manner on a circumference of the side wall portion, there is a case that the air fails to escape, and the vent holes cannot securely prevent the light. Further, since a rubber projection called a spew is formed on the outer surface of the side wall portion, at the position where the vent hole is set, and a trace after cutting the spew remains like a stub, there is a risk that the appearance of the tire is deteriorated if the number of the vent holes is increased blindly.

As a result of making a study by the present inventor, it has been known that the light tends to be generated in a specific region, and a generating frequency is different. That is, it is known that the light in the side wall portion particularly tends to be generated in the following regions (1) to (3), the generating frequency is higher in the order of (1), (2) and (3). Further, it is known that a mode of the light is frequently generated along a tire circumferential direction, and it is important to inhibit such the light from being generated.

(1) periphery of interface between tread rubber and side rubber (2) periphery of roll-up end of carcass ply (3) periphery of leading end of bead filler As mentioned in the items (1) to (3), there is a tendency that the light is generated in a peripheral region of an end of the member existing in the side wall portion. There can be considered that the vent hole is set aiming at a position of the member end, however, it is a fact that the member end tends to generate a dispersion on a process, and a light countermeasure only by the vent hole is not very effective. It is considered that the generating frequency of the light becomes higher in the order of (1), (2) and (3) mentioned above because the distance between the member end and the outer surface of the side wall portion becomes shorter in the order mentioned above, and the light is most frequently generated in the interface between the tread rubber and the side rubber which is exposed to the outer surface.

In Japanese Unexamined Patent Publication Nos. 2001-163018, 2004-17829, 11-198614, and 11-291722, there is described a pneumatic tire in which an outer surface of a side wall portion is provided with a lot of projecting lines (ridges) extending to a tire diametrical direction or a direction which is inclined from the tire diametrical direction, however, it is considered that they cannot sufficiently inhibit the light as mentioned above from being generated. In order to suppress the light in the side wall portion, it is very important to promote the rubber flow of the side rubber at a time of the vulcanization molding so as to make the air easily let out, however, the structure mentioned above cannot particularly promote the rubber flow.

Further, recessed strips corresponding to the projecting lines are provided in the inner peripheral surface of the mold which is pressed against the side wall portion, however, in the tire provided with a lot of protruding lines extending in the tire diametrical direction or the direction which is inclined from the tire diametrical direction, there is a problem that a man hour which is necessary for working the recessed strips is increased, and a mold working cost suddenly rises widely. Further, a tool tends to wear out in an early stage due to a lot of working amount, and there is a risk that a joint line appears in the projecting line so as to deteriorate the appearance of the tire, if the tool is replaced by a new one in the process of working the recessed stripe.

SUMMARY OF THE INVENTION

The present invention is made in view of the above circumstances, and an object thereof is to provide a pneumatic tire which can prevent a light from being generated in a side wall portion while suppressing a man hour which is necessary for working a recessed stripe in a mold.

The object can be achieved by the following present invention. That is, the present invention provides a pneumatic tire comprising a pair of bead portions in which a bead filler is arranged; side wall portions extending to an outer side in a tire diametrical direction from the bead portions; a tread portion connected to an outer side end in the tire diametrical direction of each of the side wall portions; and a carcass ply rolled up in its end portion in such a manner as to pinch the bead filler, wherein an outer surface of the side wall portion is provided with a concavo-convex region formed by arranging a lot of projecting lines extending in a tire circumferential direction in parallel in the tire diametrical direction, and an arranged density of the projecting lines becomes larger toward the outer side in the tire diametrical direction, and wherein an outer peripheral end of the concavo-convex region is positioned in the outer side in the tire diametrical direction than a position where an interface between a tread rubber arranged in the tread portion and a side rubber arranged in the side wall portion is exposed, and an inner peripheral end of the concavo-convex region is positioned in an inner side in the tire diametrical direction than a leading end of the bead filler.

According to the structure mentioned above, since a concavo-convex region constructed by the projecting line extending in the tire circumferential direction is provided in such a manner as to include the position where the light tends to be generated, the rubber flow of the side rubber is promoted in the tire circumferential direction at a time of the vulcanization molding, and it is possible to suitably suppress the light which tends to be generated along the tire circumferential direction. Further, since an arranged density of the protruding lines becomes larger toward an outer side in a tire diametrical direction, it is possible to obtain an effect of promoting the rubber flow in the tire diametrical direction, and the air is easily let out from the region in which the light tends to be generated. As a result, it is possible to effectively prevent the light from being generated in the side wall portion.

As mentioned above, it is a fact that the light tends to be generated in the peripheral region of the member end, and the dispersion on the process tends to be generated in the member end. However, in the present invention, since the concavo-convex region having a certain degree of broadness is provided in such a manner as to include the position where the light tends to be generated, it is possible to inhibit the light from being generated without being particularly affected by the dispersion of the member end. Further, in the present invention, since it is possible to reduce the man hour which is necessary for working the recessed stripe in the mold, in comparison with the case of being provided with a lot of protruding lines extending in the tire diametrical direction or the direction which is inclined from the tire diametrical direction, it is possible to reduce the replacing frequency of the tool so as to inhibit the joint line of the projecting lines from appearing, as well as avoiding the sudden rise of the mold working cost.

Further, the other present invention provides a pneumatic tire comprising a pair of bead portions in which a bead filler is arranged; side wall portions extending to an outer side in a tire diametrical direction from the bead portions; a tread portion connected to an outer side end in the tire diametrical direction of each of the side wall portions; and a carcass ply rolled up in its end portion in such a manner as to pinch the bead filler, wherein an outer surface of the side wall portion is provided with a concavo-convex region formed by arranging a lot of projecting lines extending in a tire circumferential direction in parallel in the tire diametrical direction, and a height of the projecting lines becomes larger toward the outer side in the tire diametrical direction, and wherein an outer peripheral end of the concavo-convex region is positioned in the outer side in the tire diametrical direction than a position where an interface between a tread rubber arranged in the tread portion and a side rubber arranged in the side wall portion is exposed, and an inner peripheral end of the concavo-convex region is positioned in an inner side in the tire diametrical direction than a leading end of the bead filler.

According to the structure mentioned above, the same operation and effect as mentioned above can be achieved. That is, the rubber flow of the side rubber is promoted in the tire circumferential direction at a time of the vulcanization molding, and it is possible to suitably suppress the light which tends to be generated along the tire circumferential direction. Further, since a height of the protruding lines becomes larger toward an outer side in a tire diametrical direction, it is possible to obtain an effect of promoting the rubber flow in the tire diametrical direction, and the air is easily let out from the region in which the light tends to be generated. As a result, it is possible to effectively prevent the light from being generated in the side wall portion.

In the structures mentioned above, it is preferable that the arranged density of the projecting lines gradually becomes larger toward the outer side in the tire diametrical direction. Accordingly, it is possible to arrange the projecting lines in a gradation manner so as to achieve a decorative effect, as well as enhancing the effect of promoting the rubber flow of the side rubber in the tire diametrical direction. Further, in the case that the height of the projecting lines is changed, since it is possible to obtain the effect of promoting the rubber flow in the tire diametrical direction by the change of the arranged density of the projecting lines in addition thereto, it is possible to smoothly let out the air from the region in which the light tends to be generated.

In the structures mentioned above, it is preferable that the concavo-convex regions are intermittently provided along the tire circumferential direction, and an opening angle between the concavo-convex regions which are adjacent to each other is set within 45°. Accordingly, since the interval of the concavo-convex region is set equal to or less than the predetermined value, it is easy to inhibit the light from being generated in the region between the concavo-convex regions.

In the structures mentioned above, it is preferable that the concavo-convex regions are continuously provided annularly along the tire circumferential direction. Accordingly, it is possible to more securely prevent the light from being generated by expressing the effect of promoting the rubber flow of the side rubber as mentioned above, over the entire peripheral length of the side wall portion.

DETAILED DESCRIPTION OF THE PREFERRED EMBODIMENTS

Figure 1:
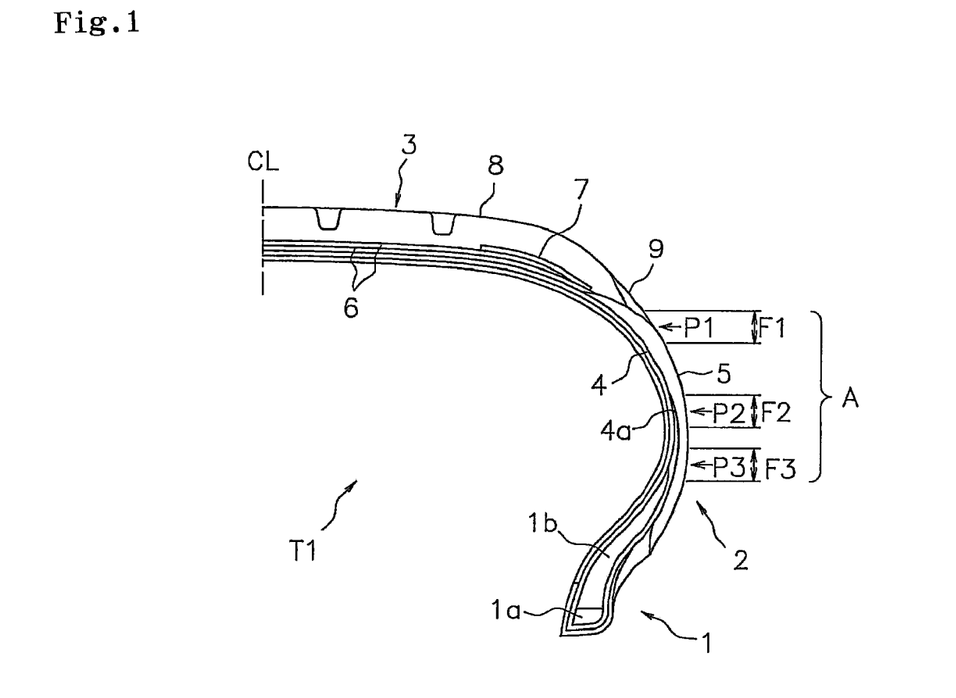
FIG. 1 is a tire meridian cross sectional view showing an example of a pneumatic tire according to the present invention.
Figure 2:
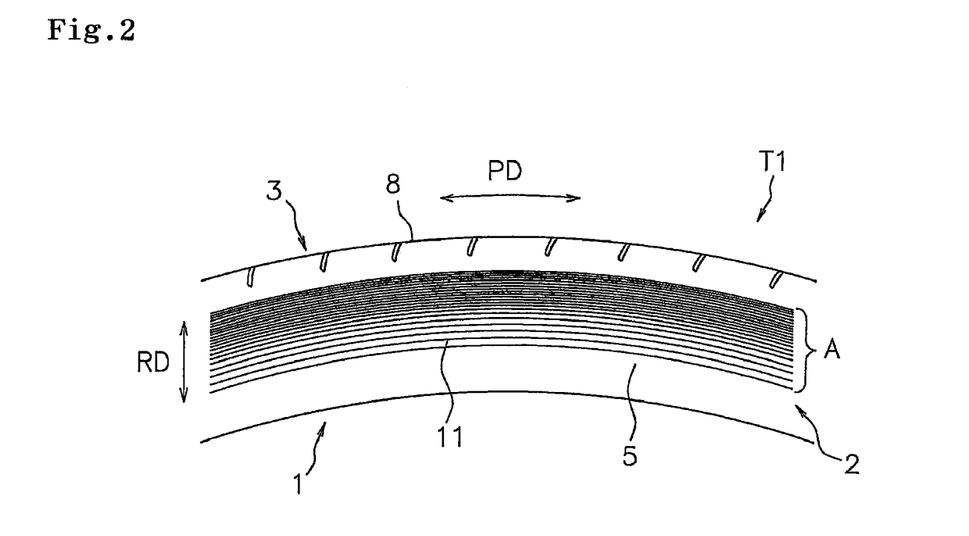
FIG. 2 is a front view showing a side wall portion of the pneumatic tire.
Figure 3:
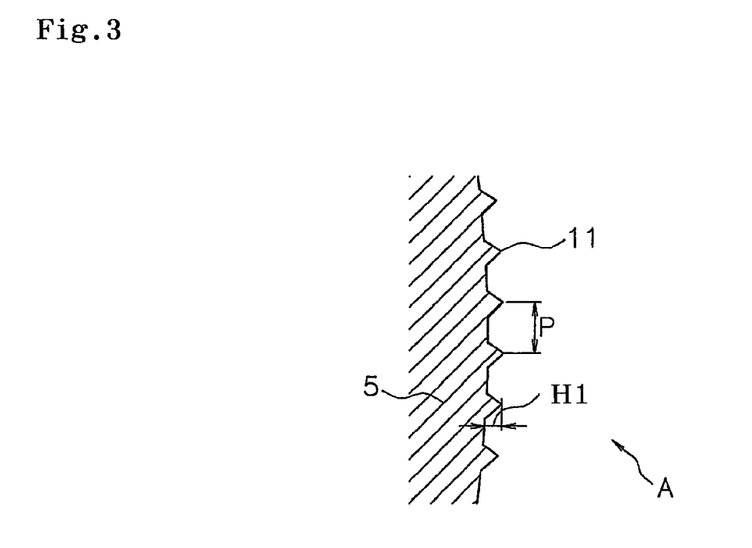
FIG. 3 is a tire meridian cross sectional view showing an outer surface of the side wall portion shown in FIG. 2 in an enlarged manner.

An embodiment of the present invention will be explained with reference to the drawings. FIG. 1 is a tire meridian cross sectional view showing an example of a pneumatic tire according to the present invention, and shows only a right half from a tire equator line CL. FIG. 2 is a front view showing a side wall portion of the pneumatic tire. FIG. 3 is a tire meridian cross sectional view showing an outer surface of the side wall portion in an enlarged manner.

A pneumatic tire T1 is a radial tire which is provided with a pair of bead portions 1, side wall portions 2 extending to an outer side in a tire diametrical direction from the bead portions 1, a tread portion 3 connected to an outer side end in the tire diametrical direction of each of the side wall portions 2, and a carcass ply 4 arranged between a pair of bead portions 1. In the bead portion 1, an annular bead core 1a and a bead filler 1b made of hard rubber are disposed. The carcass ply 4 is rolled up in its end portion in such a manner as to pinch the bead core 1a and the bead filler 1b, and a roll-up end 4a is arranged in an outer side in the tire diametrical direction than a leading end of the bead filler 1b.

A side rubber 5 is arranged in an outer periphery of the carcass ply 4 of the side wall portion 2. Further, two belt plies 6 and a narrow reinforcing ply 7 covering end portions thereof are arranged in an outer periphery of the carcass ply 4 of the tread portion 3, and a tread rubber 8 is arranged in an outermost periphery thereof. In the present embodiment, there is employed the tread rubber 8 in which a wing rubber 9 is bonded to an end portion, however, the present invention is not limited thereto. The tread rubber 8 is laminated in such a manner as to cover an outer peripheral side end portion of the side rubber 5, and an interface between the tread rubber 8 and the side rubber 5 is exposed to an outer surface.

In FIG. 1, a position P1 is a cross sectional height position at a position where the interface between the tread rubber 8 and the side rubber 5 is exposed to the outer surface. A position P2 is a cross sectional height position of the roll-up end 4a of the carcass ply 4. A position P3 is a cross sectional height position of a leading end of the bead filler 1b. The light tends to be generated in a peripheral region of the position P1, the position P2 and the position P3, in the outer surface of the side wall portion 2, and a generating frequency thereof tends to be higher in the order of the position P1, the position P2 and the position P3.

The outer surface of the side wall portion 2 is provided with a concavo-convex region A which is provided with a lot of projecting lines 11 extending in a tire circumferential direction PD in parallel in a tire diametrical direction RD, as shown in FIG. 2. The projecting line 11 is referred to as a ridge, a saw-cut line or a serration, and is formed into a triangular cross sectional shape as shown in FIG. 3 in the present embodiment. The concavo-convex region A is structured such that an outer peripheral end thereof is positioned in an outer side in the tire diametrical direction than the position P1, and an inner peripheral end thereof is positioned in an inner side in the tire diametrical direction than the position P3, and is provided in such a manner as to include a position where the light tends to be generated.

As shown in FIG. 2, in the concavo-convex region A, a pitch P of the projecting lines 11 becomes smaller toward the outer side in the tire diametrical direction, in such a manner that the arranged density of the projecting lines 11 becomes larger toward the outer side in the tire diametrical direction. Accordingly, it is possible to promote the rubber flow of the side rubber 5 in the tire circumferential direction so as to suitably suppress the light, by the projecting lines 11 extending in the tire circumferential direction PD, at a time of the vulcanization molding. In addition, it is possible to obtain an effect of promoting the rubber flow in the tire diametrical direction, and it is easy to let out the air from the peripheral region of the position P1 at which the light tends to be generated to the inner side in the tire diametrical direction. As a result, it is possible to effectively prevent the light from being generated in the side wall portion 2.

Figure 4:
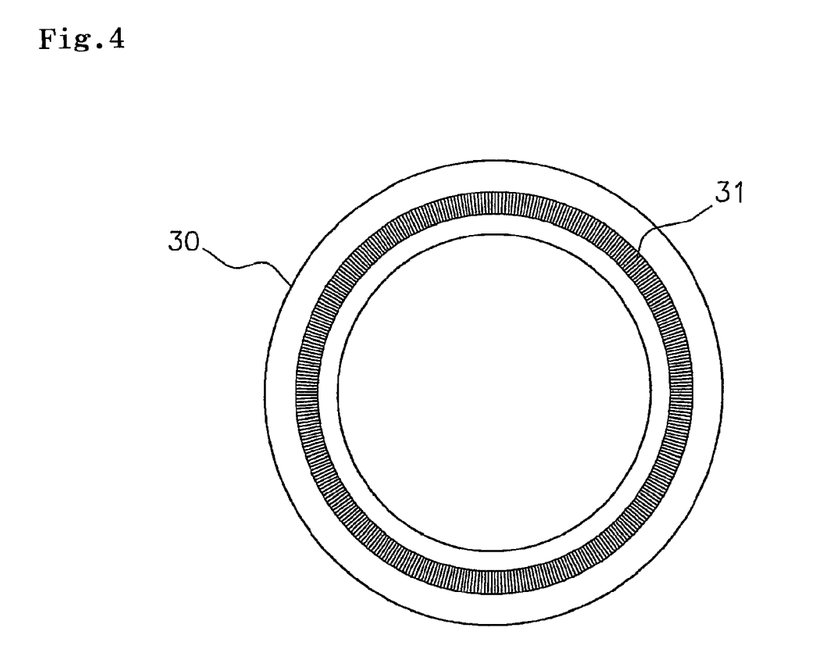
FIG. 4 is a front view schematically showing a side wall portion of a pneumatic tire which is shown for comparison.

Further, in comparison with a tire 30 provided with a lot of projecting lines 31 extending in the tire diametrical direction or the direction which is inclined from the tire diametrical direction as shown in FIG. 4, it is possible to reduce the man hour which is necessary for working the recessed stripe of the mold, in the tire T1 having the concavo-convex region A. In the tire 30, it is necessary to provide a lot of comparatively short projecting lines 31, however, in the tire T1, a suitable number of comparatively long projecting lines 11 are provided (see FIGS. 7 to 9). Accordingly, in the tire T1, it is possible to reduce the replacing frequency of the tool so as to inhibit the joint line of the projecting lines 11 from appearing, as well as avoiding the sudden rise of the mold working cost.

In FIG. 1, a region F1, a region F2 and a region F3 respectively correspond to regions having cross sectional heights 10 nun around the position P1, the position P2 and the position P3, and the generating frequency of the light tends to be higher in the order of the region F1, the region F2 and the region F3. It is preferable that the concavo-convex region A includes the region F1 and the region F3, in the light of more securely preventing the light from being generated, and the region F2 is of course included in that case.

The pitch P of the projecting lines 11 is set, for example, between 0.4 and 3.0 mm, and there is exemplified a structure in which the pitch P is set between 0.4 and 1.0 mm in the region F1, the pitch P is set between 1.0 and 2.0 mm in the region F2, and the pitch P is set between 2.0 and 3.0 mm in the region F3. As mentioned above, it is preferable that the pitch P of the projecting lines 11 is shorter in the order of the region F1, the region F2 and the region F3, and the pitch P is not necessarily changed within each of the regions.

In the region sandwiched by the regions F1 and F2, and the region sandwiched by the regions F2 and F3, the pitch P is appropriately set in such a manner that the arranged density of the projecting lines 11 becomes larger toward the outer side in the tire diametrical direction. In the present embodiment, since the arranged density of the projecting lines 11 gradually becomes larger toward the outer side in the tire diametrical direction over the entire region of the concavo-convex region A, it is possible to achieve the decorative effect by arranging the projecting lines 11 in a gradation manner as shown in FIG. 2, as well as enhancing the effect of promoting the rubber flow in the tire diametrical direction.

The pitch P of the projecting lines 11 is measured along a reference profile line (not shown) of the side wall portion 2. The reference profile line is a curved line extending along the outer surface of the side wall portion 2, and is obtained by delineating in such a manner as to couple bottom surfaces of the projecting lines 11 to each other in the tire meridian cross section.

A height H1 of the projecting line 11 is set, for example, between 0.2 and 2.0 mm, and is preferably set between 0.2 and 1.0 mm. In the example in FIG. 3, a value of the height H1 is made the same uniformly. The height H1 is measured as a distance from the reference profile line mentioned above to a vertex of the projecting line 11.

Figure 5:
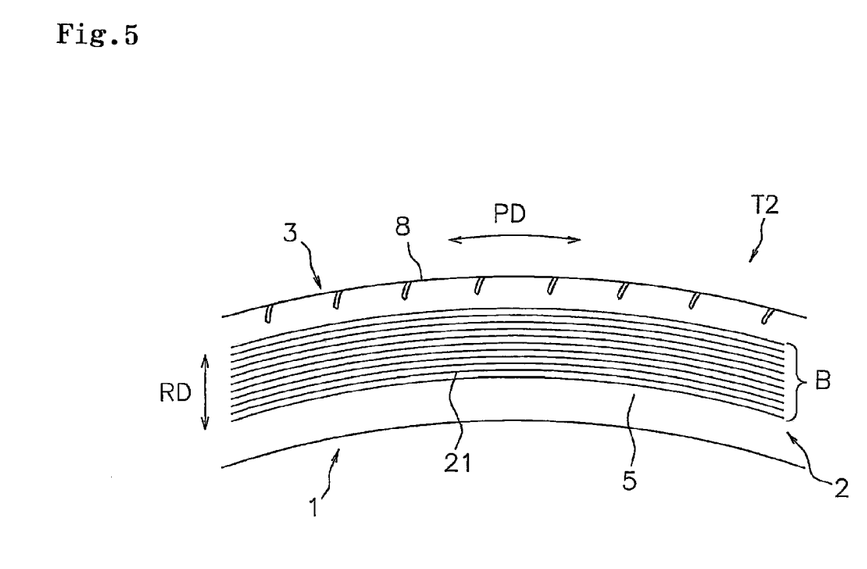
FIG. 5 is a front view showing a side wall portion in another example of the pneumatic tire according to the present invention.
Figure 6:
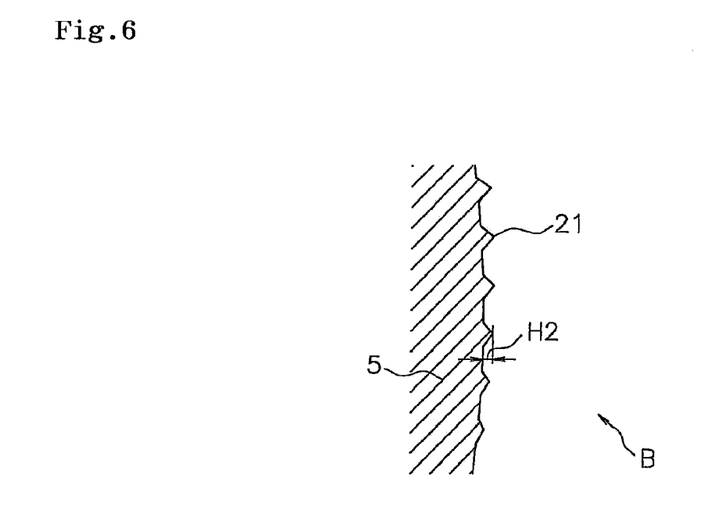
FIG. 6 is a tire meridian cross sectional view showing an outer surface of the side wall portion shown in FIG. 5 in an enlarged manner.

FIG. 5 is a front view showing a side wall portion in another example of the pneumatic tire according to the present invention. FIG. 6 is a tire meridian cross sectional view showing an outer surface of the side wall portion in an enlarged manner. The tire T2 is structured in the same manner as the pneumatic tire T1 mentioned above, except a structure relating to a concavo-convex region of the side wall portion. Accordingly, the same reference numerals are attached to the same members and positions as the members and positions described in the tire T1.

The outer surface of the side wall portion 2 of the pneumatic tire T2 is provided with a concavo-convex region B which is provided with a lot of projecting lines 21 extending in a tire circumferential direction PD in parallel in a tire diametrical direction RD. A range in which the concavo-convex region B is provided is the same as the concavo-convex region A of the tire T1. In the concavo-convex region B, the projecting lines are arranged at even intervals, however, a height H2 of the projecting line 21 becomes larger toward an outer side in the tire diametrical direction. Accordingly, it is possible to promote the rubber flow in the tire diametrical direction of the side rubber 5 at a time of the vulcanization molding, and it is easy to let out the air coming to a factor for generating the light.

The height H2 of the projecting lines 21 is set, for example, between 0.2 and 1.0 mm, and there is exemplified a structure in which the height H2 is set between 0.8 and 1.0 mm in the region F1, the height H2 is set between 0.5 and 0.8 mm in the region F2, and the height H2 is set between 0.2 and 0.5 mm in the region F3. As mentioned above, it is preferable that the height H2 of the projecting lines 21 is larger in the order of the region F1, the region F2 and the region F3, and the height H2 is not necessarily changed within each of the regions.

Further, in the concavo-convex region B in which the height of the projecting line 21 is changed, the arranged density of the projecting lines 21 may be made gradually larger toward the outer side in the tire diametrical direction, as in the concavo-convex region A mentioned above. In this case, since it is possible to obtain the effect of promoting the rubber flow of the side rubber 5 in the tire diametrical direction by the change of the arranged density of the projecting lines 21 in addition the change of the height of the projecting lines 21, it is possible to smoothly let out the air coming to a factor for generating the light.

Figure 7:
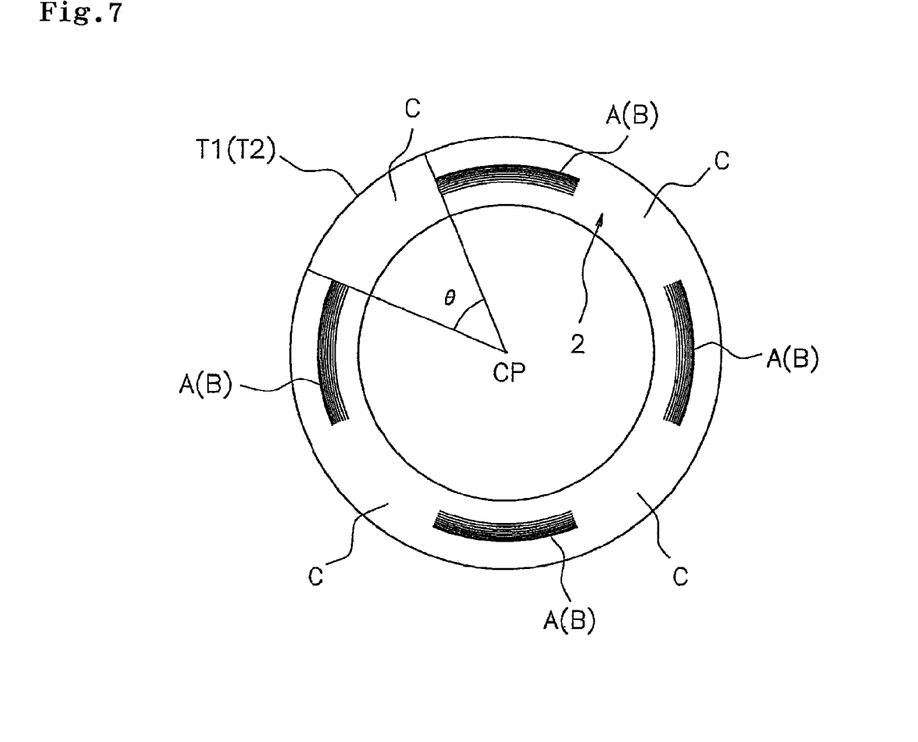
FIG. 7 is a front view schematically showing a side wall portion of a pneumatic tire according to the present invention.
Figure 8:
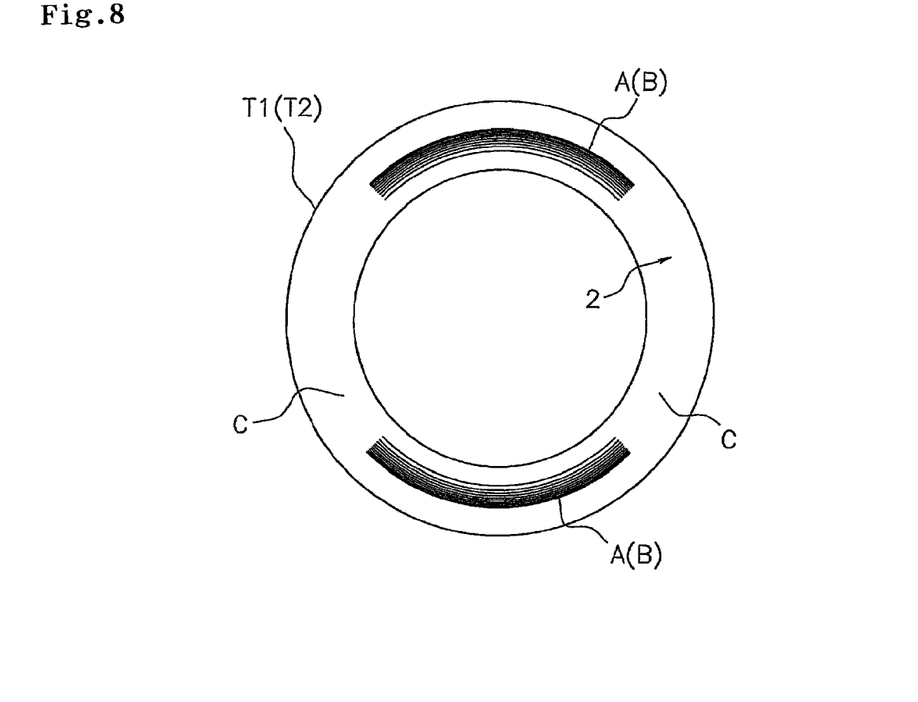
FIG. 8 is a front view schematically showing a side wall portion of a pneumatic tire according to the present invention.

The concavo-convex regions A and B mentioned above may be intermittently provided along the tire circumferential direction, as shown in FIGS. 7 and 8. In this case, it is preferable that a total of circumferential lengths of the concavo-convex regions A and B are equal to or more than one half the entire circumferential length of the side wall portion 2. Further, as shown in FIG. 7, it is preferable to set an opening angle θ between the adjacent concavo-convex regions within 45°, and it becomes easy accordingly to inhibit the light from being generated in the region C between the concavo-convex regions. The opening angle θ is measured at a center portion in the tire diametrical direction of the concavo-convex regions A and B, based on the center CP of the tire axis.

Figure 9:
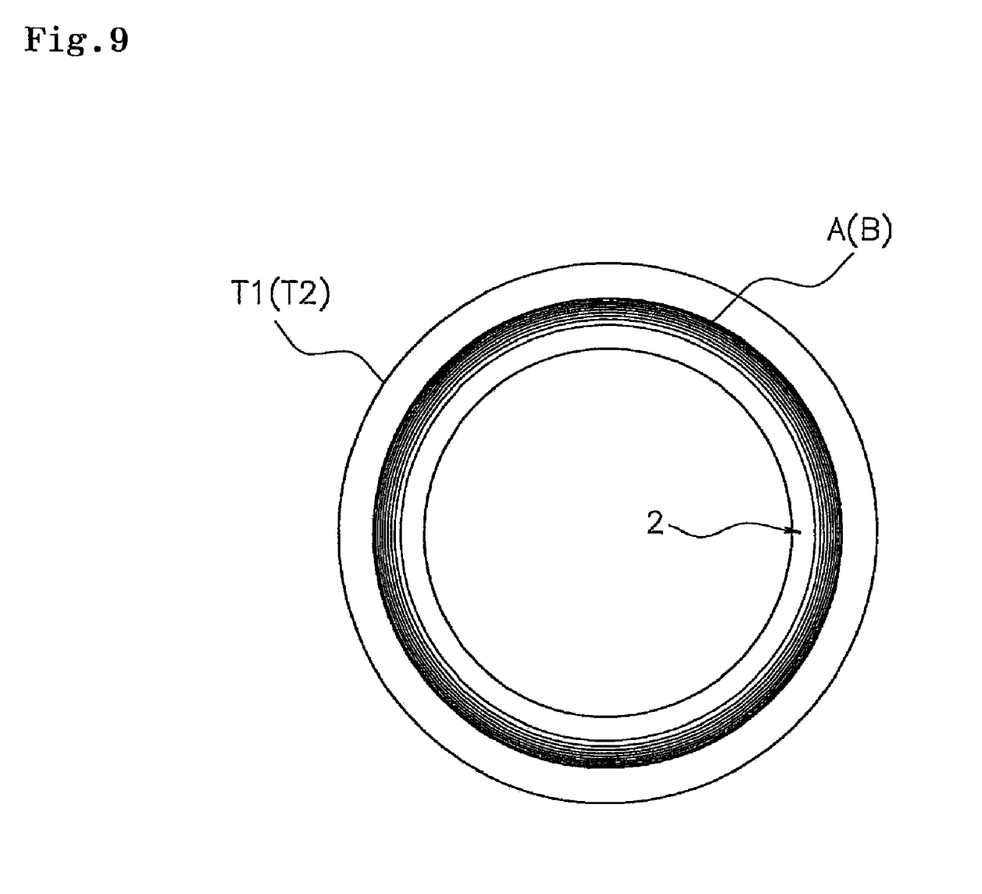
FIG. 9 is a front view schematically showing a side wall portion of a pneumatic tire according to the present invention.

In the present invention, it is preferable that the concavo-convex regions A or B are continuously provided annularly along the tire circumferential direction as shown in FIG. 9. In this case, it is possible to more securely prevent the light from being generated over the entire peripheral length of the side wall portion 2.

The pneumatic tire in accordance with the present invention is similar to a normal pneumatic tire except provision of the concavo-convex region as mentioned above on an outer surface of the side wall portion, and it is possible to employ the conventionally known material, shape, structure, manufacturing method and the like to the present invention.

The pneumatic tire according to the present invention can be manufactured only based on such a modification as to be provided with the recessed stripe corresponding to the projecting line as mentioned above in the mold which is pressed against the side wall portion at a time of the vulcanization molding, while keeping the others the same as the conventional tire manufacturing step. A vent hole may be set on the projecting line in such a manner as to smoothly discharge the air to the outer portion, in the portion corresponding to the concavo-convex region of the mold.

Other Embodiment (1) In the embodiment mentioned above, there is shown the example in which the projecting line has the triangular cross sectional shape, however, the present invention is not limited thereto, but can employ various cross sectional shapes, for example, a semicircular shape, a trapezoidal shape and the like. Further, in FIGS. 3 and 6, there is shown the example in which the interval is provided in the bottom surface between the projecting lines which are lined up in the tire diametrical direction, however, the interval mentioned above may not be provided in the portion in which the arranged density of the projecting lines is large.

(2) In the case that the concavo-convex region is intermittently provided along the tire circumferential direction, the tire circumferential end portion of the concavo-convex region formed into the circular arc shape may be inclined with respect to the tire diametrical direction, whereby it is possible to enhance the design characteristic of the side wall portion. Further, in the region between the concavo-convex regions as in the region C shown in FIG. 7, the projecting lines may not be particularly provided, however, a lot of projecting lines extending in the tire diametrical direction or the direction which is inclined from the tire diametrical direction may be provided.

Example

An example tire which concretely shows the structure and effect of the present invention will be explained. An evaluation of each of performances is executed as follows.

(1) Generating Condition of Light

The size and the number were measured in the lights generated in the side wall portion of ten vulcanized test tires (size 225/45R17), and the average value was calculated in each of the region F1, the region F2 and the region F3 mentioned above. The size of the light was determined by setting the size equal to or more than 8 mm to "large", the size between 5 and 7.9 mm to "middle", the size between 2.1 and 4.9 mm to "small", and the size equal to or less than 2 mm to "very small". The light "very small" is evaluated as the allowable range because it can be corrected.

(2) Working Time of Recessed Strips

The time which is necessary for working the recessed strips on the inner peripheral surface of the mold which is pressed against the side wall portion was evaluated.

Comparative Example 1

The projecting line extending annularly along the tire circumferential direction was provided on the outer surface of the side wall portion in the region F1, the region F2 and the region F3 one by one. The projecting line was formed into the triangular cross sectional shape, and had a height 0.5 mm.

Comparative Example 2

The outer surface of the side wall portion was provided with the concavo-convex region formed by arranging a lot of projecting lines extending annularly along the tire circumferential direction in parallel in equal intervals. The concavo-convex region included the region F1, the region F2 and the region F3, and the pitch of the projecting lines was set to 1.0 mm. Further, the height and the cross sectional shape of the projecting line were set to the same as the comparative example 1.

Comparative Example 3

As shown in FIG. 4, the outer surface of the side wall portion was provided with the concavo-convex region formed by arranging a lot of projecting lines extending in the tire diametrical direction in parallel in the tire circumferential direction. The size of the concavo-convex region and the height and the cross sectional shape of the projecting line were set to the same as the comparative example 2. The pitch of the projecting lines was set to 1.0 mm in the center portion in the tire diametrical direction of the concavo-convex region.

Example 1

As shown in FIG. 7, the outer surface of the side wall portion was provided with the concavo-convex region formed by arranging a lot of projecting lines extending in the tire circumferential direction in parallel in the tire diametrical direction, and the arranged density of the projecting lines became larger toward the outer side in the tire diametrical direction. The concavo-convex region was intermittently provided along the tire circumferential direction, and the opening angle thereof was set within 45°. The size of the concavo-convex region and the height and the cross sectional shape of the projecting line were set to the same as the comparative example 2. The pitch of the projecting lines was set between 0.8 and 1.0 mm in the region F1, between 1.0 and 2.0 mm in the region F2, and between 2.0 and 3.0 mm in the region F3.

Example 2

As shown in FIG. 8, the outer surface of the side wall portion was provided with the concavo-convex region formed by arranging a lot of projecting lines extending in the tire circumferential direction in parallel in the tire diametrical direction, and the arranged density of the projecting lines became larger toward the outer side in the tire diametrical direction. Further, the concavo-convex regions were intermittently provided along the tire circumferential direction, and the opening angle thereof was set so as to exceed 45°. The size of the concavo-convex region and the height, the cross sectional shape and the pitch of the projecting line were set to the same as the example 1.

Example 3

Example 3 was structured in the same manner as the example 1 except the matter that the concavo-convex region is continuously provided annularly along the tire circumferential direction as shown in FIG. 9. Results of the evaluation are shown in Table 1.

TABLE 1

| | Generating condition of light | | | Working time of projecting line (Hr/both faces) |
|---|---|---|---|---|
| | Region F1 | Region F2 | Region F3 | |
| Comparative example 1 | Large: 4 | Middle: 2 | Small: 1 | 2.0 hours |
| Comparative example 2 | Middle: 2 | Small: 1 | None | 28.0 hours |
| Comparative example 3 | None | None | None | 76.0 hours |
| Example 1 | Very small: 1 | None | None | 10.0 hours |
| Example 2 | None | None | None | 12.0 hours |
| Example 3 | Small: 2 | Very small: 1 | None | 15.0 hours |

As shown by the results of Table 1, in the examples 1 to 3, it is possible to prevent the light from being generated in the side wall portion in comparison with the others. The light in the example 3 is generated in the region between the concavo-convex regions, and the light is not generated in the concavo-convex region. In the comparative example 3, a lot of time is necessary for working the recesses strips, however, in the examples 1 to 3, since it is possible to reduce the man hour which is necessary for working the recessed stripe, the working time is short and these examples are advantageous in the point of the mold working cost and the like.

What is claimed is:

1. A pneumatic tire comprising:
a pair of bead portions in which a bead filler is arranged;
side wall portions extending to an outer side in a tire diametrical direction from the bead portions;
a tread portion connected to an outer side end in the tire diametrical direction of each of the side wall portions; and
a carcass ply rolled up in its end portion in such a manner as to pinch the bead filler,
wherein an outer surface of the side wall portion is provided with a concavo-convex region formed by arranging a lot of projecting lines extending in a tire circumferential direction in parallel in the tire diametrical direction, a pitch of the projecting lines is between 0.4 and 3.0 mm, and the height of the projecting lines is the distance from a reference profile line of the side wall portion to a vertex of the projecting lines and is between 0.2 and 2.0 mm, and an arranged density of the projecting lines becomes larger toward the outer side in the tire diametrical direction, and
wherein an outer peripheral end of the concavo-convex region is positioned in the outer side in the tire diametrical direction than a position where an interface between a tread rubber arranged in the tread portion and a side rubber arranged in the side wall portion is exposed, and an inner peripheral end of the concavo-convex region is positioned in an inner side in the tire diametrical direction than a leading end of the bead filler, and
further comprising a first region at a first position where the interface formed by the tread rubber and the side rubber are exposed, a second region at a second position where the rolled up end portion of the carcass ply pinches the bead filler, the second position being at an inner side in the tire diametrical direction from the first position, and a third region at a third position where the leading end of the bead filler terminates, the third position being at an inner side in the tire diametrical direction from the second position each of the first second and third regions having cross sectional heights of 10 mm around their respective first, second and third positions, wherein the pitch of the projecting lines in the first region is between 0.4 and 1.0 mm, the pitch of the projecting lines in the second region is between 1.0 and 2.0 mm and the pitch of the projecting lines in the third region is between 2.0 and 3.0 mm.

2. The pneumatic tire according to claim 1, wherein the arranged density of the projecting lines gradually becomes larger toward the outer side in the tire diametrical direction.

3. The pneumatic tire according to claim 1, wherein the concavo-convex regions are intermittently provided along the tire circumferential direction, and an opening angle between the concavo-convex regions which are adjacent to each other is set within 45°.

4. The pneumatic tire according to claim 1, wherein the concavo-convex regions are continuously provided annularly along the tire circumferential direction.

5. A pneumatic tire comprising:
a pair of bead portions in which a bead filler is arranged;
side wall portions extending to an outer side in a tire diametrical direction from the bead portions;
a tread portion connected to an outer side end in the tire diametrical direction of each of the side wall portions; and
a carcass ply rolled up in its end portion in such a manner as to pinch the bead filler,
wherein an outer surface of the side wall portion is provided with a concavo-convex region formed by arranging a lot of projecting lines extending in a tire circumferential direction in parallel in the tire diametrical direction, a height of the projecting lines gradually becomes larger toward the outer side in the tire diametrical direction, and the height of the projecting lines is the distance from a reference profile line of the side wall portion to a vertex of the projecting lines and is between 0.2 and 1.0 mm, and wherein an outer peripheral end of the concavo-convex region is positioned in the outer side in the tire diametrical direction than a position where an interface between a tread rubber arranged in the tread portion and a side rubber arranged in the side wall portion is exposed, and an inner peripheral end of the concavo-convex region is positioned in an inner side in the tire diametrical direction than a leading end of the bead filler.

6. The pneumatic tire according to claim 5, wherein an arranged density of the projecting lines gradually becomes larger toward the outer side in the tire diametrical direction.

7. The pneumatic tire according to claim 5, wherein the concavo-convex regions are intermittently provided along the tire circumferential direction, and an opening angle between the concavo-convex regions which are adjacent to each other is set within 45°.

8. The pneumatic tire according to claim 5, wherein the concavo-convex regions are continuously provided annularly along the tire circumferential direction.

9. The pneumatic tire according to claim 5, further comprising a first region at a first position where the interface formed by the tread rubber and the side rubber are exposed, a second region at a second position where the rolled up end portion of the carcass ply pinches the bead filler, the second position being at an inner side in the tire diametrical direction from the first position, and a third region at a third position where the leading end of the bead filler terminates, the third position being at an inner side in the tire diametrical direction from the second position, each of the first, second and third regions having cross sectional heights of 10 mm around their respective first, second and third positions, wherein the height of the projecting lines in the first region is between 0.8 and 1.0 mm, the height of the projecting lines in the second region is between 0.5 and 0.8 mm and the height of the projecting lines in the third region is between 0.2 and 0.5 mm.

* * * * *

UNITED STATES PATENT AND TRADEMARK OFFICE
CERTIFICATE OF CORRECTION

PATENT NO.        : 8,261,793 B2
APPLICATION NO.   : 12/619832
DATED             : September 11, 2012
INVENTOR(S)       : Toshihiko Takahashi It is certified that error appears in the above-identified patent and that said Letters Patent is hereby corrected as shown below:

Column 10, Line 30 (Claim 1, line 38), delete "position" and insert --position,--.

Column 10, Line 30 (Claim 1, line 38), delete "first" and insert --first,--.

Signed and Sealed this
Sixth Day of November, 2012

David J. Kappos
*Director of the United States Patent and Trademark Office*